(12) United States Patent
Kurian et al.

(10) Patent No.: US 10,642,338 B2
(45) Date of Patent: May 5, 2020

(54) HIERARCHICAL POWER MANAGEMENT UNIT FOR LOW POWER AND LOW DUTY CYCLE DEVICES

(71) Applicant: Intel Corporation, Santa Clara, CA (US)

(72) Inventors: Dileep J. Kurian, Bangalore (IN); Pranjali S. Deshmukh, Bangalore (IN); Sriram Kabisthalam Muthukumar, Coimbatore (IN); Ankit Gupta, Bangalore (IN); Tanay Karnik, Portland, OR (US); David Arditti Ilitzky, Guadalajara (MX); Saurabh Bhandari, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 15/719,483

(22) Filed: Sep. 28, 2017

(65) Prior Publication Data
US 2019/0094949 A1 Mar. 28, 2019

(51) Int. Cl.
*G06F 1/32* (2019.01)
*G06F 1/3287* (2019.01)
*G06F 1/3296* (2019.01)
*G06F 1/324* (2019.01)

(52) U.S. Cl.
CPC ............ *G06F 1/3287* (2013.01); *G06F 1/324* (2013.01); *G06F 1/3296* (2013.01)

(58) Field of Classification Search
CPC combination set(s) only.
See application file for complete search history.

(56) References Cited

U.S. PATENT DOCUMENTS

| 8,185,762 | B1 | 5/2012 | Spangler et al. | |
| 2004/0268278 | A1* | 12/2004 | Hobernnan | G06F 1/3203 716/127 |
| 2006/0117192 | A1* | 6/2006 | Nokkonen | G06F 1/305 713/300 |
| 2010/0174925 | A1 | 7/2010 | Barde | |
| 2012/0072743 | A1 | 3/2012 | Lee et al. | |
| 2013/0311794 | A1* | 11/2013 | Stewart | G06F 1/26 713/300 |

(Continued)

FOREIGN PATENT DOCUMENTS

KR 1020110123698 11/2011

OTHER PUBLICATIONS

Knapp et al., "Design and Implementation of an Energy-Neutral Solar Energy System for Wireless Sensor-Actuator Nodes", IEEE, 2017 Global Internet of Things Summit (GIoTS), Jun. 6-9, 2017.*

(Continued)

*Primary Examiner* — Stefan Stoynov
(74) *Attorney, Agent, or Firm* — Green, Howard, & Mughal LLP

(57) ABSTRACT

An apparatus is provided which comprises: a first Power Management Unit (PMU); and a second PMU, wherein the first PMU is to manage transition of the apparatus from a low power state to a first active state, wherein the second PMU is to manage transition of the apparatus from the first active state to a second active state, and wherein the second PMU is to be powered down while the apparatus is to be in the low power state.

19 Claims, 4 Drawing Sheets

(56) References Cited

U.S. PATENT DOCUMENTS

2015/0346001 A1* 12/2015 Tripathi .................. G01D 9/00
                                                                                         702/190
2016/0034016 A1    2/2016 Suurballe
2016/0336794 A1* 11/2016 Hsu ........................ H02J 7/34

OTHER PUBLICATIONS

International Search Report & Written Opinion dated Dec. 3, 2018 for PCT Patent Application No. PCT/US2018/048458.

* cited by examiner

HIERARCHICAL POWER MANAGEMENT UNIT FOR LOW POWER AND LOW DUTY CYCLE DEVICES

BACKGROUND

A low power device may have a low duty cycle, e.g., where the device may be in an active state for a relatively short time period, and may remain in a sleep state for a relatively longer time period. When the device is in the sleep state, the device may consume some power. It may be useful to reduce the power consumption of the device, while the device is in the relatively longer time period of the sleep state.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
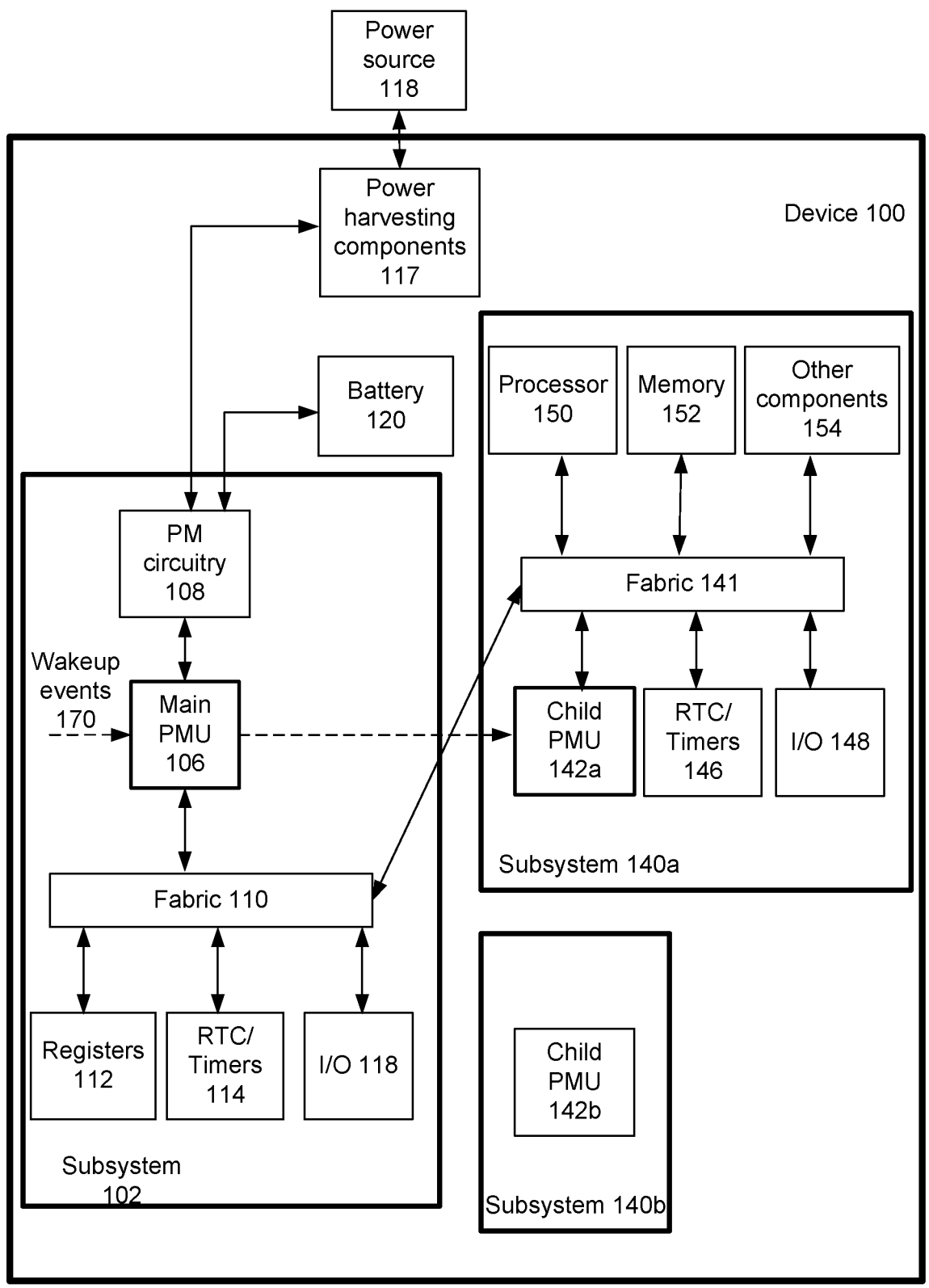
FIG. 1A illustrates a device implementing hierarchical power management, e.g., to save power during one or more sleep states of the device, according to some embodiments.

In a low power device or a net-zero energy device having low duty cycle of operation, the device may be in a sleep state for most of the time. The device may consume a small amount of power, while in the sleep state. However, the small amount of power consumed in the long duration of the sleep state may add up to non-negligible amount of power. In an example, the power consumed during the sleep state may be due to an operation of a Power Management Unit (PMU).

In some embodiments, in order to save power in one or more sleep states, the PMU of the device may be divided in multiple units or hierarchies. For example, the PMU may be divided in at least a main PMU and one or more child PMUs (e.g., hierarchies of child PMUs). For example, the main PMU may be a light weight PMU, e.g., consumes less power and have limited operating capabilities, and may be ON even during one or more sleep states. The more complex power management operation may be handled by one or more child PMUs, which may be switched ON during active states, and may remain OFF during one or more sleep states (e.g., may be off during a deep sleep state and possibly other sleep states). Because only the lightweight and less power consuming main PMU is now ON during the one or more sleep states, power consumption of the device in the sleep state may be reduced. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1A illustrates a device 100 implementing hierarchical power management, e.g., to save power during one or more sleep states of the device 100, according to some embodiments.

In some embodiments, the device 100 may be a low power device. In some embodiments, the device 100 may be a Net zero energy (NZE) device, a low power device, and/or the like. A NZE device (also referred to as an energy neutral device) may harvest or scavenge energy to recuperate the charge it consumes during operation (e.g., during one or more active states). As an example, in a NZE device, the re-charge instantaneous rate and the discharge instantaneous rate may not be equal (e.g., recharge may be slower than discharge), but average rate of discharge and re-charge may be about the same. Thus, when the instantaneous rates differ widely, a net-zero energy device may rely on duty cycling to achieve the same average rate of discharge and recharge. Large differences in instantaneous charge and discharge rates may be common, for example, in cases of tiny net-zero energy device expected to perform sporadic computationally complex tasks.

In an example, NZE devices are rapidly gaining popularity in a sensor rich ecosystem with self-sustaining energy harvesting designed to achieve energy neutrality. A NZE device, such as the device 100, may include a battery, e.g., a battery 120 that may be powered by an external power source 118 via power harvesting components 117. In an example, the power harvesting components 117 may comprise power harvesting transducers, such as solar panels, piezo transducers, RF transducers, wind turbines, etc. In some embodiments, the power source 118 may not draw power from an external electrical connection, such as an Alternating Current adapter. Instead, the power source 118 may be a renewable or other power source(s) that may harvest energy, such as solar power, thermal power, power generated from vibration of the device 100, power generated from thermal energy, power generated from piezo-electric effect, power generated from directed Radio Frequency energy, and/or the like. In some embodiments, in addition to, or instead of, the device 100 being a NZE device, the device 100 may be a low power device (e.g., consuming relatively less power).

In some embodiments, a recharge rate (e.g., energy harvesting or scavenging rate) in the device 100 may be low for some environmental reason (e.g. during night, when harvesting is based on solar power, or during an idle wind context when the device harvests from wind power). In this context, harvesting may be either small or null, and thus the power consumption of the sleep state may drain out the stored charge (e.g. from a battery). Such issues may be more pronounced when the device 100 has constrained battery sizes, as the charge storage capacity that needs to sustain this prolonged state may be more limited.

In some embodiments, the device 100 may be used for any appropriate applications, e.g., used as a wearable device, as an Internet of Things (IoT) device, in sensing applications, in voice recognition applications, in image recognition applications, and/or in any appropriate application area.

In some embodiments, the device 100 may have a low duty cycle of operation, where a duty cycle may be a ratio of a duration of one or more sleep states and a total duration of time the device 100 is operational. Merely as an example, the duty cycle of operation of the device 100 may be 1% or lower. For example, if the duty cycle of operation of the device 100 is 1%, then for about 99% of the time the device 100 may be in one or more sleep states, and for about 1% of the time the device 100 may be in one or more active states. For example, to support a variety of applications, the device 100 may normally perform low-duty cycle operations. Thus, meaningful computation may be performed for a short period of time, after which the device 100 may enter a sleep state, during which energy may be harvested (e.g., from the power source 118) to replenish the consumed charge in the battery 120.

In some embodiments, the device 100 having a low duty cycle of operation may imply that the duty cycle is 10% or less, 5% or less, or 1% or less.

In some embodiments, to maintain a sleep state of the device 100, one or more components of the device 100 may always remain ON (e.g., even when the device 100 may be in a sleep state). In some embodiments, as the device 100 may operate on a limited amount of harvested energy, it may be useful to reduce even a small amount of constant power drawn by the one or more components of the device 100 that are always (or most of the time) operational (e.g., is either in a sleep state or an active state). For example, it may be useful to reduce the power consumed in the sleep state of the device 100 to a minimum. Thus, because the device 100 is likely to remain in one or more sleep states (e.g., a deep sleep state) for about 99% of the time or less, even a slight decrease in the power consumption during the sleep state may have high impact on the power consumption over a period of time.

Various embodiments of this disclosure discuss methods, apparatus and circuits to reduce the power consumption of the device 100, e.g., while the device 100 is in one or more sleep states.

Referring again to FIG. 1A, in some embodiments, the device 100 may comprise subsystems 102, 140a, and 140b. In some embodiments, the subsystem 102 may be in a first die, the subsystem 140a may be in a second die, and/or the subsystem 140b may be in a third die. In some other embodiments, the subsystem 102 and one or both the subsystems 140a or 140b may be in a same die.

In some embodiments, the subsystem 102 may include one or more components that may be ON or in an active state, e.g., even when the device 100 is in a sleep state. In contrast, one or more components (e.g., all the components) of the subsystems 140a and/or 140b may be powered OFF (e.g., in an inactive state), when the device 100 is in the sleep state (e.g., in a deep sleep state). Also, in some embodiments and as will be discussed in more details herein later, the subsystem 140a and/or 140b may perform all or most of the computational tasks of the device 100.

For purposes of this disclosure, the subsystem 102 may also be referred to as a main subsystem, an always ON subsystem (AON subsystem), a parent subsystem, a root subsystem, and/or the like. On the other hand, the subsystems 140a and/or 140b may also be referred to as a child subsystem, a compute subsystem, and/or the like.

Although FIG. 1A illustrates one AON subsystem 102 and two child subsystems 140a, 140b, in some embodiments, the device 100 may have one, three, or higher number of child subsystems. In some embodiments, the device 100 may have one (e.g., only one) AON subsystem, e.g., the subsystem 102.

The child subsystems 140a, 140b may generally be referred to as subsystem 140 in singular, and subsystems 140 in plural.

In some embodiments, the device 100 may have one main Power Management Unit (PMU) 106 included in the AON subsystem 102. In some embodiments, the device 100 may have one or more child PMUs included in corresponding one or more child subsystems 140. For example, in the example illustrated in FIG. 1A, the device 100 has child subsystem 140a and 140b comprising child PMUs 142a and 142b, respectively.

The child PMUs 142a, 142b, and any other child PMUs not illustrated in FIG. 1A may generally be referred to as child PMU 142 in singular, and child PMUs 142 in plural.

In some embodiments, the AON subsystem 102 may comprise Power Management (PM) circuitry 108. In some embodiments, the PM circuitry 108 may comprise Power Management Integrated Circuit (PMIC) analog circuits. In some embodiments, among other functions, the PM circuitry 108 may harvest energy from the power source 118, e.g., to charge the battery 120. In some embodiments, the PM circuitry 108 may also deliver power from the battery 120 to main power rails (not illustrated in FIG. 1A) of the device 100. Thus, for example, the PM circuitry 108 may include harvesting circuitry to harvest energy from the energy source 118 and to recharge the battery, and power delivery circuitry to deliver power from the battery 120 to the power rails of the device 100, etc. In some embodiments, the PM circuitry 108 may be controlled by the main PMU 106.

Figure 1B:
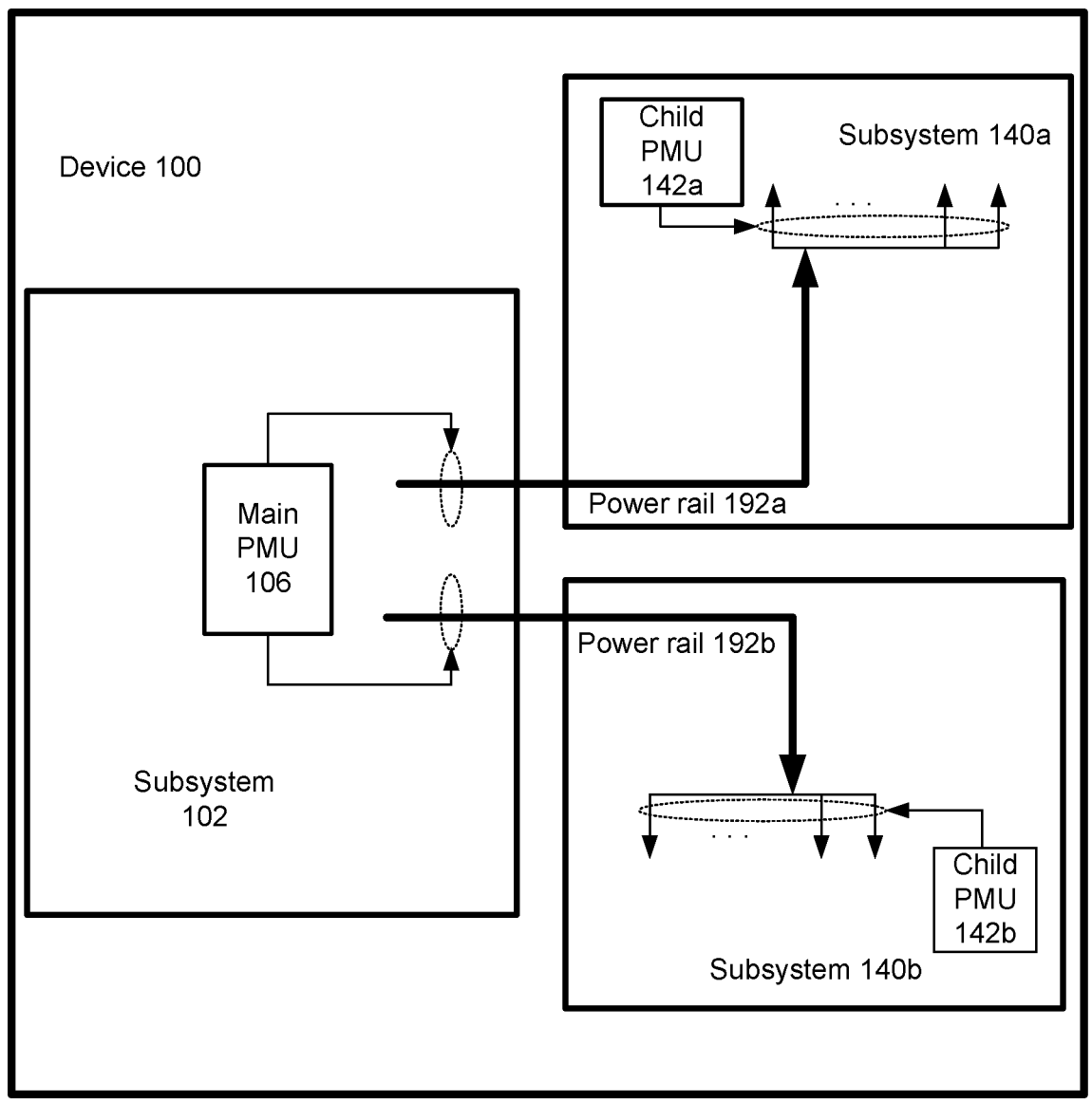
FIG. 1B illustrates various power rails of the device of FIG. 1A, according to some embodiments.

FIG. 1B illustrates various power rails of the device 100 of FIG. 1A, according to some embodiments. For illustrative clarity, only some of the components of the device 100 are illustrated in FIG. 1B. FIG. 1B also illustrates power rails 192a and 192b supplying power to the subsystem 140a and 140b, respectively. Also, FIG. 1B symbolically illustrates (e.g., using dotted oval shapes within the subsystem 102) that the main PMU 106 may supply and/or control the power rails 192a, 192b, which are supplied from the subsystem 102 (e.g., supplied from the main PMU 106) to all other subsystems 140. A child PMU 142 may receive and/or control a corresponding power rail. In an example, a power rail 192a within the subsystem 140a may supply power to multiple power islands or power domains, and the corresponding child PMU 142a may control the power to these domains (e.g., symbolically illustrated using dotted oval shapes within the subsystem 140a). In some embodiments, the child PMUs 142 may not have direct access to the battery or main supply, and the main PMU 106 may be capable of bringing up the child PMUs, which, in turn, may bring up their respectively subsystems.

Referring again to FIG. 1A, in some embodiments, the subsystem 102 may comprise an interconnection fabric 110 that may communicatively couple the main PMU 106, one or more registers 112, Real Time Clock (RTC)/Timers 114, and/or Input/Output (I/O) peripherals 118. In some embodiments, the RTC/Timers 114 may track a real-time clock of the device 110, generate signals and/or timers for periodically or aperiodically wake up the device 100 from a sleep state, keep track of one or more timers of the device 100, etc. In some embodiments, the I/O 118 may comprise I/O peripherals via which, for example, the device 100 may receive signals for waking up from a sleep state to an active state. As discussed herein above, various components of the subsystem 102 may be in an active or ON state, even when the device 100 may be in a sleep state.

In FIG. 1A, only the child subsystem 140a is illustrated in some details, and the details of the subsystem 140b is not illustrated for purposes of illustrative clarity. In some embodiments, the subsystem 140b may have structure that may be at least in part similar to the subsystem 140a.

In some embodiments, the subsystem 140a may comprise the child PMU 142, RTC/Timers 146, and I/O peripherals 148. In some embodiments, the RTC/Timers 146 and/or I/O peripherals 148 may be included in a child AON domain, e.g., these components may always be ON or active, when the device 100 is in an active state (although these components may be OFF, when the device 100 is in a sleep state).

In some embodiments, the subsystem 140a may further comprise one or more processors 150, a memory 152, and/or various other components 154, e.g., various IP blocks (e.g., a reusable unit of logic, cell, or integrated circuit layout design that may be the intellectual property of another party), peripherals, communication interfaces, sensors, etc. In some embodiments, the subsystem 140a may comprise an interconnect fabric 141 connecting various components of the subsystem 140b, and connecting to the fabric 110 of the subsystem 102.

In an example, in an energy-neutral system or a low-power system such as device 100, very low duty cycles of activity may be expected (e.g., as discussed herein previously, the device 100 may be in a sleep state (e.g., a deep sleep state) for about 99% or higher amount of time). In some embodiments, the device 100 may implement a hierarchical PMU architecture, e.g., where the full PMU functionality may be split into a main or root PMU (e.g., PMU 106) and one or more layers of child PMUs such as child PMUs 142a, 142b (e.g., a number of child PMUs may depend on the functionality). In an example, the main PMU 106 (also referred to as root PMU) may be a relatively lightweight hardware PMU (e.g., consuming relatively less power) and may be Always ON (e.g., ON even during a deep sleep state of the device 100). For example, during a deepest sleep state, in which the device 100 may reside for the majority of the time, the one or more child PMUs may be powered OFF to save energy, but the main PMU 106 may remain ON (e.g., assuming that the charge of the battery 120 and/or the current harvesting rate by the power source 118 may allow the main PMU 106 to remain ON). The main PMU 106 may work in conjunction with the child PMUs 142 to manage the power states of the device 100.

In some embodiments and as discussed herein, the main PMU 106 may be always ON (e.g., as long as the battery 120 and/or the current harvesting rate by the power source 118 has enough power to sustain the ON state of the main PMU 106), irrespective of whether the device 100 is in an active state or one of one or more sleep states. In some embodiments, the main PMU 106 may consume relatively less power. In some embodiments, the main PMU 106 may comprise a reconfigurable Finite State Machine (FSM) to manage basic power management functions of the device 100.

For example, the main PMU 106 may facilitate power state transitions of the device 100 in a sleep state and/or out of a sleep state. For example, when the device 100 is in the sleep state, the main PMU 106 may receive one or more wake-up events 170. The wake-up events 170 may be external asynchronous wake events (e.g., generated based on external input via the I/O 118), generated by the RTC/Timers 114, and/or the like. Based on the wake-up events 170, the main PMU 106 may transition the device 100 from a sleep state to an active state (e.g., may turn on one or more of the child PMUs 142, depending on its configuration, such as the configuration of the above discussed reconfigurable FSM).

In some embodiments, the main PMU 106 may facilitate forced power state transitions from an active power state to a sleep state, e.g., when the power level of the battery 120 is lower than a threshold level (e.g., where the threshold level may correspond to a critical power level of the battery 120). For example, the main PMU 106 may cause force a transition from the active power state to the sleep state, even when computational task may be pending.

In some embodiments, the main PMU 106 may notify distinct child PMUs 142 when the battery level reaches a pre-configured threshold. For example, the main PMU 106 may notify a child PMU 142 a warning message when the battery level drops to a threshold (but not yet critically low) during an active power state in which a subsystem 140 managed by the child PMU 142 is operational.

In another example, the main PMU 106 may notify to a child PMU 142 (e.g., child PMU 142a) when the battery level increases up to a threshold, e.g., when the child PMU 142a is ON, while most of the components (e.g., processor 150, memory 1152, etc.) of the corresponding subsystem 140a are OFF (e.g., waiting) during a sleep power state (but not the deep power state). For example, upon receiving such a notification, the child PMU 140a may know that sufficient power is available, and may wake up one or more of these components.

In some embodiments, the main PMU 106 may control one or more power rails (illustrated in FIG. 1B) of the device 100. For example, the device 100 may have one or more power rails (e.g., power rails 192a, 192b) supplying power to corresponding one or more subsystems, and the main PMU 106 may control the power rails. In some embodiments, the main PMU may supply power to one or more the subsystems (e.g. subsystems 140a, 140b) through the aforementioned one or more power rails (e.g., power rails 192a, 192b) at a pre-defined voltage level, while the child PMUs corresponding to the one or more subsystems (e.g. child PMUs 142a, 142b) may control the voltage level or voltage state being supplied, from the corresponding power rail, into one or more voltage domains within the subsystem (e.g. symbolically illustrated using dotted ovals within the subsystems 140a, 140b). For example, the main PMU 106 may control the power rail 192a supplying power to the subsystem 140a (e.g., the main PMU 106 may control switching ON and/or OFF of the power rail 192a). In turn, the child PMU 142a being supplied by the power rail 192a may (in addition to controlling the power switching ON and/or OFF for each of the domains internal to the subsystem 140a) control the voltage level for the different rails feeding each of the voltage domains internal to the subsystem 140a (e.g. symbolically illustrated using dotted oval within the subsystem 140a), therefore controlling the voltage level of the various components of subsystem 140a. Thus, put differently, the main PMU 106 may have coarse control of the power rail 192a supplying power to the child subsystem 140a, and the corresponding child PMU 142a may have finer control of voltages supplied from the power rail 192a into the various components of the child subsystem 140a. Thus, depending on the state of the device 100, the child PMU 142a may selectively increase or decrease the voltage level for individual components of the subsystem 140a. Merely as an example, when the device is in an active power state meant for high compute activity, the main PMU 106 may turn ON the power rail 192a supplying power to the child subsystem 140a, and in turn the child PMU may increase the voltage level supplied to a computing component; and once the high compute activity ends and the power state changes to an active power state meant for low compute activity, the child PMU may decrease the voltage level supplied to the aforementioned computing component.

In some embodiments, the main PMU 106 may control voltage levels of all (or at least some of) the power rails 192. For example, the main PMU 106 may receive requests from one or more child PMUs with respect to modifications of the voltage levels of the corresponding power rails. The main PMU 106 may arbitrate between potentially conflicting requests, and acknowledge the requesting child PMUs whether or not their requests are being serviced. In some embodiments, the main PMU 106 may modify voltage levels of one or more power rails, e.g., based on the resolution of the requests from the one or more child PMUs. For example, the main PMU 106 may control switching ON or OFF of the power rail 192a, and/or may also control the voltages supplied to various power domains within the subsystem 140a by the power rail 192 (e.g., in such an example, the dotted oval shape within the subsystem 140a may be controlled by the main PMU 142a, instead of the child PMU 106—although such controlling by the main PMU 106 may be based on requests from the child PMU 142a).

In an example, assume that a first power rail 192a is to supply power to the subsystem 140a and a second power rail 192b is to supply power to the subsystem 140b (e.g., see FIG. 1B). In an active state and to complete one or more computational task of the device 100, assume that the subsystem 140a has to be ON and the subsystem 140b can remain OFF or inactive. In such an example, the main PMU 106 may power the first power rail 192a and wake up the child PMU 142a, e.g., while refraining from powering the second power rail 192b and refraining from waking up the child PMU 142a. The child PMU 142a may wake up and operate in accordance with various embodiments discussed herein.

In some embodiments, the main PMU 106 may interact with the PM circuitry 108, e.g., to harvest power in the battery 120, to manage the battery power, to power ON or OFF the different power rails supplying power to the different child-PMUs, etc.

Thus, in some embodiments, the main PMU 106 may handle relatively less computationally intensive power management tasks (e.g., executing which may consume relatively less power). On the other hand, in some embodiments, the child PMUs 142a, 142b may handle relatively computationally intensive power management tasks. For example, the child PMU 142a may comprise a FSM to manage power state transitions between different active states, or from an active state to a sleep state when the active tasks of the device 100 are completed.

In some embodiments, the child PMU 142a (e.g., the FSM of the child PMU 142a, and/or another component within the child PMU 142a) may also handle the dynamic frequency and voltage scaling for its corresponding subsystem in order to track the optimal performance point for the subsystem's operation, dependent on the device power state. In some embodiments, the child PMU 142a (e.g., the FSM of the child PMU 142a, and/or another component within the child PMU 142a) may also handle the retention states for the required memory and register components in the corresponding subsystem, during one or more sleep power states. In some embodiments, the child PMU 142a (e.g., the FSM of the child PMU 142a, and/or another component within the child PMU 142a) may also service one or more power-related requests from the components of the corresponding subsystem (e.g., handling requests from the CPUs or MCUs).

For example, in some embodiments, the voltage-scaling in the subsystem 140a may be handled by the child PMU 142a. For example, the child PMU 142a may have its own Power Management Circuits, DC-DC conversion components, etc. In some embodiments, the child PMU 142a may use such components to accelerate an automatic DFVS handled by the child PMU 142a, e.g., without intervention from the main PMU 106 (e.g., as long as the power specifications of the main PMU power rail 192a are adhered to). In some embodiments, the child PMU 142a may use such components to enable the subsystem 140 to maintain different voltages, without intervention from the main PMU 106 (e.g., voltage rail for the memory 152 may be different from the voltage rail for the processor 152, as illustrated in FIG. 1B), all drawing power from the same power rail 192a supplied by the main PMU 106. In some embodiments, such arrangement may reduce area and//or complexity of the main PMU 106, e.g., the DC-DC converters in the child PMUs may be in separate partitions. In some embodiments, such arrangement may enable digital logic automating the voltage scaling, e.g., the power rail may be power-gated alongside with the subsystem.

In some embodiments, a child PMU 142 may be implemented as a hardware (HW) FSM. In some embodiments, if a subsystem (e.g., subsystem 140a) managed by a child PMU (e.g., child PMU 142a) contains a programmable processor (e.g., the processor 150), at least a part of the child PMU 142a may be implemented in Software (SW).

In some embodiments and as discussed herein previously, a child PMU 142 may manage power rail sequencing, dynamic voltage & frequency scaling (DVFS) of power supplied to individual components of the corresponding subsystems 140, and/or the like.

In some embodiments, the device 100 may operate in more than one active states. For example, upon the device 100 entering a first active state (e.g., a regular active state discussed in FIG. 2), a child PMU 142 may be in charge of transitioning to a specialized second active power state (e.g., a high active state discussed in FIG. 2), requesting (e.g., to the main PMU 106) power rails 192 to be selectively powered ON or OFF, optimizing operating conditions (e.g., via DVFS) given the application's requirements, etc. Once the active task is completed by a child subsystem, the child PMU 142 may request the main PMU 106 to transition to one of one or more sleep states (e.g., to a low power state, a deep sleep state, or the like, e.g., depending on the implementation). For example, if the tasks of all the child PMUs 140a, 140b, etc. are completed, the main PMU 106 may cause the device 100 to transition to a sleep state.

In some embodiments, a power rail (e.g., power rail 192a) may be already powered on, but with a limited power supplying capacity, and the child PMU 142a may request the main PMU 106 to increase such capacity, e.g., before entering the above discussed high active state. The main PMU 106 may, in turn, activate extra circuits (e.g., which were previously deactivated to reduce power consumption) to increase the supply capacity in the power rail 192a.

As discussed previously, once an active task is completed by a child subsystem, the child PMU 142 may request the main PMU 106 to transition to one of one or more sleep states (e.g., to a low power state, a deep sleep state, or the like, e.g., depending on the implementation). For example, if the tasks of all the child PMUs 140a, 140b, etc. are completed, the main PMU 106 may cause the device 100 to transition to a sleep state. For example, if some memory is to be kept in a retention mode and cannot be powered off (but voltage can be scaled down), the child PMU 142a may power OFF all other components in the subsystem (including the memory banks that are not required to have retention), the child PMU 142a may request the main PMU 106 to reduce the capacity of the power rail 192a for this subsystem, and may then scale the voltage of the power sub-rail specific to the memory to the minimum voltage allowed in retention mode. In this scenario, the child PMU 142a may still be ON. Thus, in this case, the main PMU 106 cannot power down completely the power rail 192a to this subsystem 140a, as that would power down the memories and loose the retention. This restriction in turn may limit the sleep power state to which the main PMU may transition (e.g., the device 100 may not enter a deep sleep state). Once the requirement of the memory retention is completed, the child PMU 142a may be switched OFF, and the main PMU 106 may cause the device 100 to transition to a sleep state (e.g., a deep sleep state).

In some embodiments, a child PMU 142 may receive state-of-charge information (e.g., information about the charge of the battery 120) from the main PMU 106. For example, if the battery 120 is running non-critically low (e.g., when the battery power is lower than a non-critical threshold), the main PMU 106 may issue an interrupt warning to the child PMUs 142, and a child PMU 142 may decide to complete, pause or abort pending tasks. For example, the child PMU 142 may decide to pause the pending task, and return control to the main PMU 106, based on which the main PMU 106 may cause the device 100 to enter a sleep state (e.g., so that energy may be harvested to recharge the battery in due course).

Thus, in some embodiments, upon a non-critically low energy scenario, a battery warning interrupt may be generated by the main PMU 106. Upon reception of such an interrupt, each child PMU 142 may decide, based on the pending tasks versus the available energy, to either complete the remaining task, or to store its current state in retention storage and transition to a sleep state. Once the battery 120 has harvested enough energy (e.g., from the power source 118), the main PMU 106 may then wake up the device 100 from the sleep state to an active state, and the pended tasks may be completed by the corresponding child subsystem 140.

Upon a critical state-of-charge condition (e.g., when the battery power is lower than a critical threshold), the main PMU 106 may override the child PMUs 142, and may force a transition to a predefined sleep state.

In some embodiments, a child PMU 142 may be powered ON, e.g., only when a corresponding child subsystem 140 being handled by that child PMU 142 needs to be turned ON. As such, for net-zero energy devices, the children PMUs 142 may be powered ON during very brief periods of time, e.g., as these devices may reside in sleep states for most of the time.

In some embodiments, in case of a multiple-die scenario, the main PMU 106 and the child PMUs 140 may reside on separate dies. The main PMU 106 may reside on a die with the supply subsystem (e.g., which may receive power from the battery 120). The child PMUs 142 may reside in other dies, with a child PMU 142 handling the complete power management for the corresponding die in which the child PMU 142 resides. In this way, the child dies may be completely turned off during low power or sleep states, thereby resulting in significant energy savings.

In an example, in a multiple-die scenario, the dies may be manufactured using different technologies, and the die for the main PMU 106 may be manufactured in a technology that may be optimal or near optimal for the efficient implementation of power the supply and harvesting system (e.g., may comprise one or more analog circuits). In such an example, the main PMU 106 may handle all or at least some of the DC to DC conversions for the voltage rails, and may handle voltage level changes upon request of a child PMU 142 of the receiving subsystem.

In another example, in case of a single-die scenario, the main PMU 106 and one or more of the child PMUs 140 may reside on a single die. The child subsystems 140 may be completely turned off (e.g., by controlling power rails supplying power to these subsystems) during low power or sleep states, thereby resulting in significant energy savings.

The split PMU architecture may drastically reduce the power consumption in system sleep state, e.g., without compromising the flexibility offered by the main PMU 106 and the child PMUs 142.

Although FIG. 1A and sections of this disclosure refer to the components 106 and 142 respectively as main PMU and child PMUs, these components may be referred to using any other appropriate term. For example, a PMU may be referred to as a Power Management Controller (PMC), a Power Manager (PM), a Power Management Architecture (PMA), a power controller, power management circuitry, and/or using any other appropriate term that would be understood by those skilled in the art.

In some embodiments and although not specifically labelled in FIG. 1A, the subsystem 102 may be in a first die and the subsystem 140a may be in a second die. The first die may be an energy die (e.g., may receive power from the battery 120, and may control power distributed to other dies). In some embodiments, the first die may be in a low-power process node, e.g., consume relatively low power to remain active. In some embodiments, the second die comprising the subsystem 140a (or the subsystem 140b) may be a compute die (e.g., may perform main computation to implement the functionalities of the device 100). In some embodiments, the second die may be on a high-integration process node, and may contain the system's acceleration IPs, main memory 152, processors 150, and a corresponding child PMU 142a. In some embodiments, the second die may comprise multiple power domains, e.g., based on the application, where the child PMU 142 may control power to the multiple power domains. As discussed herein, a child PMU 142 may operate only during active power states, and therefore, in an example, a part of the operation of the child PMU 142 may be software driven (e.g., by a processor of the corresponding subsystem 140).

In some embodiments, logic of the main PMU 106 may be based on leakage tolerant design techniques, e.g., thereby saving power. In some embodiments, the AON main subsystem 102 may have low operating voltage (e.g., compared to an operating voltage of the child subsystems 140), e.g., thereby saving power. In some embodiments, the device 100 and/or the subsystem 102 may transition to a low frequency mode, e.g., when the device 100 is to operate in the sleep state, e.g., thereby saving power.

In some embodiments, the hierarchical structure of the PMUs in the device 100 may implement one or more active power states, one or more sleep power states, a recovery power state, and/or the like.

For example, if in a power state any of the compute elements (e.g., processors, accelerators, child PMUs, etc.) of the device 100 are turned ON, the power state may be categorized as an active power state. For example, the compute elements of the device 100 may be in one or more child subsystems 140, and thus, in an active power state, at least one of the child subsystems 140 may be turned on. There may be multiple active power states, e.g., based on a number of child subsystems 140 being turned on (e.g., whether one or both the subsystems 140a or 140b are turned on), based on individual components of various child subsystems being turned on, based on applications performed by the device 100, etc. In some embodiments, a transition from one active state to another active state (or from an active state to a sleep state) may be controlled by a child PMU 140. In some embodiments, in case of a critically low energy condition, the main PMU 106 may override the child PMUs 140, and force a transition of the device 100 to a sleep state. During a non-critically low energy condition, the main PMU 106 may issue an interrupt warning to the child PMUs 140, as discussed herein earlier in further details.

In an example, a power state in which one or more of the compute elements, fabrics in the child subsystems, non-retention memories, and/or the like are turned OFF may be termed as a sleep power state. In sleep states, the bare essential components (e.g., components that generate asynchronous events for system operation, alarms, timers, environment sensing events, the main PMU 106, the PM circuitry 108, etc.) may be powered ON. In some embodiments, there may be multiple sleep states in the device 100, e.g., based on the application. Merely as an example, in a deep sleep state, the RTC/Timers 114, the I/O 118, etc. may be turned OFF (e.g., although the main PMU 106 may be ON); and in a regular sleep state, the RTC/Timers 114, the I/O 118, and the main PMU 106 may be ON. In some embodiments, the main PMU 106 may manage transitions within various sleep states, e.g., based on the state-of-charge (e.g., charge level of the battery 120) and/or asynchronous events. In some embodiments, the main PMU 106 may also manage transition from a sleep state to an active state. For example, the main PMU 106 may manage transition from the sleep state to the active state, based on wakeup events 170, provided that the battery 120 has sufficient power to sustain the active state.

Throughout this disclosure, one or more sleep states have been discussed. The sleep states may, for example, have different levels (deep sleep state, hibernation state, regular sleep state, light sleep state, one or more low power states, etc.). In some embodiments, a sleep state may correspond to a low power or sleep state defined in Advanced Configuration and Power Interface (ACPI) standard. In some examples, sleep state and low power state may be used interchangeably.

In some sleep states (e.g., a light sleep state, a low power state, etc.), a child PMU (e.g., child PMU 140a) may still be ON, while another child PMU (e.g., child PMU 140b) may be OFF. In some sleep states (e.g., a deep sleep state, a deepest sleep state, etc.), all the child PMUs 142 may be turned OFF, along with all the subsystems 140. In some embodiments, the device 100 may be in such sleep state for most of the time (e.g., more than 95% of the time, about 99% of the time, etc.), during which all the child PMUs 142 and all the subsystems 140 are be turned OFF.

In some embodiments, a recovery power state may be a minimal power consumption state used, for example, during power-outage. For example, if the battery 120 does not have sufficient power to sustain one or more components of the main subsystem 102, the device 100 may enter the recovery power state. In some embodiments, in the recovery power state, the main PMU 106 may be OFF, e.g., based on the power level of the battery 120. The device 100 may harvest power via the power source 118, e.g., to exit the recovery power state. In some embodiments, during a recovery power state, the device 100 may lose (e.g., completely loses) its internal state, e.g., any information that was not stored in a non-volatile medium may be lost.

Although terms like active states, sleep states are used herein, these states may be referred to using any other appropriate terms. Merely as an example, the sleep states may be termed as low power states, active states may be referred to as high power states, and/or the like.

In some embodiments, minimal abstract interfaces between the hierarchies of PMUs may be as follows. From the main PMU 106 to the child PMUs 142, child PMU active states may be allowed (e.g., based on current state of the main PMU 106). In some embodiments, the main PMU 106 may periodically or aperiodically inform the child PMUs 142 on the current state-of-charge (e.g., information on the charge of the battery 120), e.g., when the device 100 is in an active state. For example, when the battery charge level is lower than a threshold (e.g., non-critically low), the main PMU 106 may issue an interrupt warning to the child PMUs 142. In some embodiments, the main PMU 106 may respond to requests from the child PMUs 142. In some embodiments, a child PMU 142 may request the main PMU 106 for main power state change, for change in a corresponding power rail state, etc.

Figure 2:
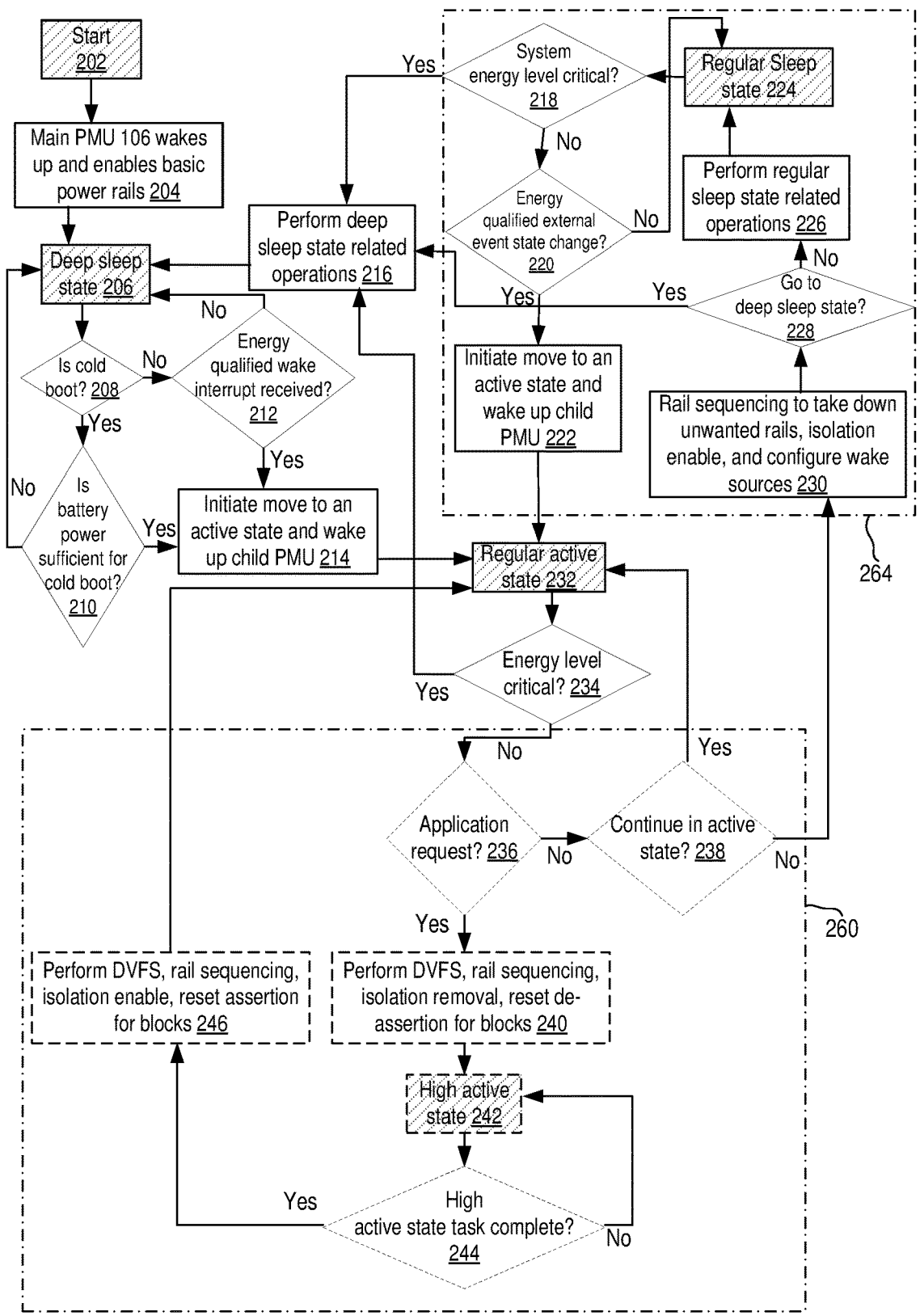
FIG. 2 illustrates a flowchart depicting a method for operating hierarchical Power Management Units (PMUs) of the device of FIG. 1A, according to some embodiments.

FIG. 2 illustrates a flowchart depicting a method 200 for operating the hierarchical PMUs of the device 100 of FIG. 1A, according to some embodiments. Although the blocks in the flowchart with reference to FIG. 2 are shown in a particular order, the order of the actions can be modified. Thus, the illustrated embodiments can be performed in a different order, and some actions/blocks may be performed in parallel. Some of the blocks and/or operations listed in FIG. 2 may be optional in accordance with certain embodiments. The numbering of the blocks presented is for the sake of clarity and is not intended to prescribe an order of operations in which the various blocks must occur.

In FIG. 2, the shaded blocks (e.g., blocks 206, 224, 232, 242, etc.) may represent various operating states of the device 100. The blocks with dashed outline (e.g., blocks 236, 238, 240, 242, 244, 246, et.) may represent operations managed by a child PMU 142. The blocks with solid outline may represent operations managed by the main PMU 106. The blocks inside a dash-dotted rectangle 260 may represent operations associated with tasks for a high active state of a specific child subsystem 140 (e.g., child subsystem 140a). The blocks inside the dash-dotted rectangle of 264 may represent operations associated with operating in a regular sleep state.

The method 200 starts at 202. At 204, the main PMU 106 may wake up and enable basic power rails. Subsequently, the device 100 may enter (or remain) in a deep sleep state, e.g., illustrated as block 206.

At 208, the device 100 may determine if the starting of the device 100 is a cold boot. If "Yes" at 208, then at 210, the main PMU 106 may decide if the battery 120 has sufficient charge for a cold boot process (e.g., if the battery 120 has sufficient charge for at least a basic system wakeup process). If "No" at 210, then the device 100 may continue to remain at the deep sleep state of 206 (e.g., may come out of the deep sleep state later, after the battery 120 has harvested enough energy to get out of the deep sleep state).

Also, if "No" at 208, then at 212, the main PMU 106 may determine if an energy qualified wake interrupt was received. An energy qualified wake interrupt may be a wakeup event 170 of FIG. 1A. If "No" at 212, the device 100 remains in the deep sleep state of 206 (e.g., as there is no wakeup event, there is no use of transitioning in an active state, the device 100 remains in the deep sleep state of 206).

If "Yes" at either 210 or 212, then the method 200 moves to block 214, when the main PMU 106 may start transitioning the device 100 to an active state (e.g., a regular active state). For example, to transition the device to the regular active state, the main PMU 106 may, at 214, wake up one or more child PMUs 142a, 142b, etc., perform power rail sequencing, perform isolation removal (e.g., subsystems that were electrically isolated may be powered again), may enable platform power rails, and/or perform other operations for transitioning the device 100 to the regular active state. Subsequently, at 232, the device 100 may transition to the regular active state.

Thus, the device 100 may transition from the deep sleep state at 206 to the regular active state at 232 if, for example, the device 100 is performing a cold boot process (e.g., determined at 208) and/or if there are qualified wakeup events (e.g., determined at 212).

In some embodiments and as discussed herein before, the device 100 may have more than one active states, e.g., at least the regular active state of 232 and a high active state of 242. For example, during the regular active state of a subsystem 140 (e.g., the subsystem 140a), the child PMU 142a may be ON and operational. The processor 150 may (or may not) be operational, but the processor 150 may not perform power demanding tasks associated with a functionality of the device. In contrast, in the high active state, the processor 150 may be performing power demanding tasks associated with a functionality of the device 100. In some embodiments, a voltage and/or a frequency of the processor 150 at the high active state may be higher than those of the processor 150 at the regular active state.

The blocks inside the dash-dotted rectangle of 260 may represent operations associated with tasks for a high active state of a specific child subsystem 140 (e.g., child subsystem 140a). If the child subsystem 140 performs tasks for multiple high active states, and/or if there are multiple child subsystems 140 performing operations associated with high active states, the blocks within the dash-dotted rectangle of 260 may be repeated.

Referring again to block 232, once the device 100 is in the regular active state, the device 100 (e.g., the main PMU 106) may determine at 234 if the battery energy level is critical (e.g., below a threshold value). If "Yes" at 234 (e.g., if the battery energy level is critical), the PMU 106 may perform deep sleep state related operations at 216, and the device 100 may go back to the deep sleep state at 206.

If "No" at 234, then the device 100 may have enough power to possibly enter a high active state. Thus, if "No" at 234, the subsystem 140a (e.g., the child PMU 142a) may determine at 236 if one or more application requests are pending (e.g., where an application request may be a request for the processor 150 to perform high energy tasks associated with the high active state).

If there are no application requests pending (e.g., if "No" at 236), then at 238, the child PMU 142a may determine if the subsystem 140a is to remain in the current regular active state (e.g., based on anticipating an application request soon, and/or based on another appropriate criteria). If "Yes" at 238, the subsystem 140a may remain at the regular active state of 232. If "No" at 238, the flow may proceed to block 230, e.g., to prepare the device 100 to transition to a sleep state (e.g., to the deep sleep state or to a regular sleep state). Block 230 and associated operations are discussed herein later.

If "Yes" at 236 (e.g., if there is at least one application request pending), then at 240 the child PMU 142a may perform DVFS, rail sequencing, isolation removal, reset de-assertion for blocks, etc. Subsequently, the subsystem 140a may enter a high active state at 242. In some embodiments, the operations at 240 may be to make the subsystem 140a ready for transitioning to the high active state. For example, the DVFS (e.g., which may be controlled by firmware) may be to increase a frequency and/or voltage of the processor 150, the memory 152, etc., so that these components can perform the high-energy tasks in the high active state at higher efficiency. The power rail sequencing may be to supply appropriate voltage to various components of the subsystem 140a. The isolation removal may be to remove an island in the subsystem 140a that is not receiving power (e.g., to ensure that the components to be used for the high active state are all powered up and ON).

In some embodiments, at the high active state 242, the subsystem 140a (e.g., the processor 150) may perform the tasks associated with the application request of 236. At 244, the child PMU 142a may check if the high active state tasks are completed—if not, the subsystem 140a may remain in the high active state at 242.

Once the tasks of the high active state are completed (e.g., if "Yes" at 244), at 246, the child PMU 142a may perform operations to undo the effects of the operation at 240. For example, the child PMU 142a may perform DVFS (e.g., firm controlled DVFS to reduce the voltage and/or the frequency of the processor 150), perform rail sequencing, enable isolation of one or more components of the subsystem 140a, reset assert blocks, etc. Subsequent to 246, the device 100 may transition from the high active state to the regular active state of 232.

Referring again to bock 238, in some embodiments, if "No" at 238, the method 300 may proceed to block 230, e.g., to prepare the device 100 to transition to the deep sleep state or the regular sleep state. At block 230, the main PMU 106 may perform power rail sequencing, e.g., to take down unwanted power rails that are not to be used during a sleep state, may enable power isolation of one or more components, child PMUs 142, and/or child subsystems 140, and/or may configure wakeup sources (e.g., sources that may generate wakeup events 170).

Subsequent to 230, the device 100 (e.g., the main PMU 106) may determine at 228 if the device 100 is to enter a deep sleep state. For example, as discussed herein previously, the device 100 may enter in one of multiple sleep states, such as the deep sleep state, the regular sleep state, etc. Merely as an example, in the deep sleep state, the RTC/Timers 114, the I/O 118, etc. may be turned OFF (e.g., although the main PMU 106 may be ON); and in the regular sleep state, the RTC/Timers 114, the I/O 118, and the main PMU 106 may remain ON.

If "No" at 228 (e.g., if the device 100 is to enter the regular sleep state), then at 226 the main PMU 106 may perform operations associated with entering the regular sleep state. At 224, the device 100 may enter the regular sleep state.

Also, if "Yes" at 228 (e.g., if the device 100 is to enter the deep sleep state), then at 216, the main PMU 106 may perform operations associated with entering the deep sleep state, and at 206 the device 100 may enter the deep sleep state.

If the device 100 wants to exit the regular sleep state, at 218, the PMU 106 may determine if the battery power level is critical. If "Yes" at 218 (e.g., the device 100 does not sufficient power to sustain the regular sleep state), at 216 the main PMU 106 may perform operations associated with entering the deep sleep state, and at 206 the device 100 may enter the deep sleep state.

If "No" at 218 (e.g., the device 100 has sufficient power), the PMU 106 may determine at 220 if there is an energy qualified external event state change (e.g., which may correspond to the wakeup events 170). If "No" at 220, then device 100 may then re-enter the regular sleep state. If "Yes" at 220 (e.g., if there is a wakeup event), at 222 the PMU 106 may initiate a transition to an active state and wake up child PMU (e.g., similar to block 214).

The blocks inside the dash-dotted rectangle of 264 may represent operations associated with operating in a regular sleep state. The regular sleep state may merely be an example of a sleep state. In some embodiments, other types of sleep states may be envisioned (e.g., based on the components that are to be switched OFF during the sleep state). The blocks inside 264 may be repeated for such different sleep states.

Figure 3:
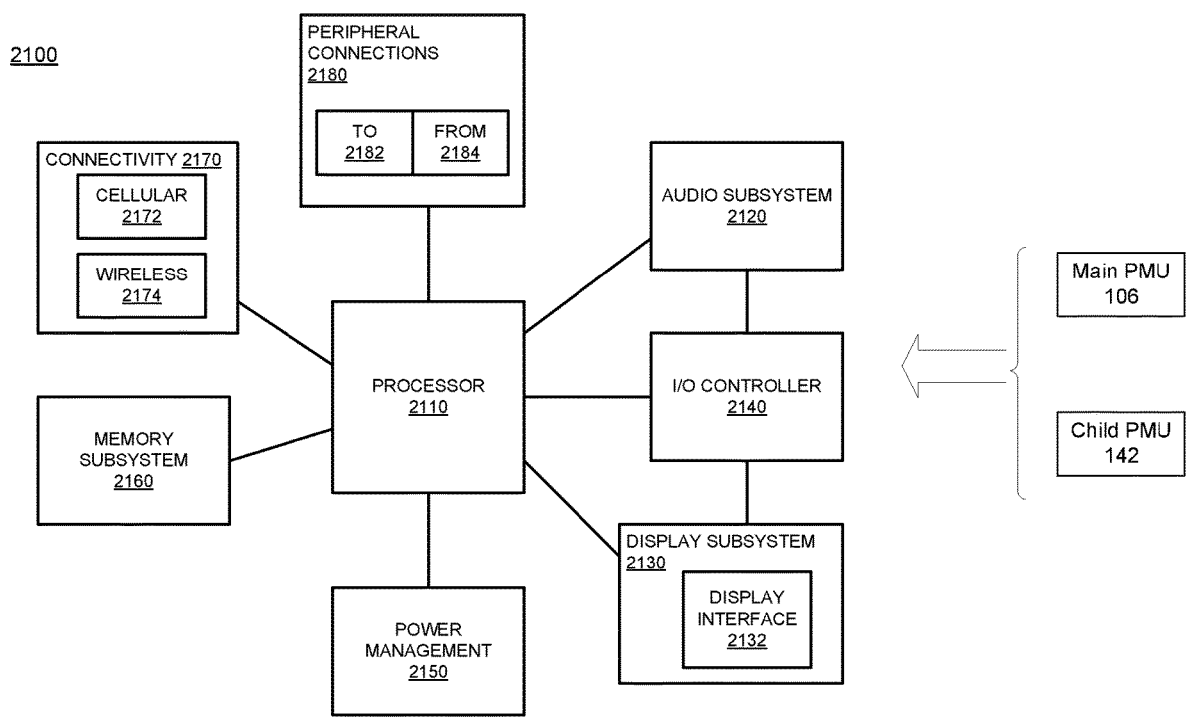
FIG. 3 illustrates a computing device, a smart device, a computing device or a computer system or a SoC (System-on-Chip), where a hierarchical power management architecture is implemented to save power in sleep states, according to some embodiments.

FIG. 3 illustrates a computing device 2100, a smart device, a computing device or a computer system or a SoC (System-on-Chip) 2100, where a hierarchical power management architecture may be implemented to save power in sleep states, according to some embodiments. It is pointed out that those elements of FIG. 3 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise hierarchical power management architecture comprising the main PMU 106 and one or more child PMUs 142, e.g., as discussed with respect to FIGS. 1-2.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a first Power Management Unit (PMU); and a second PMU, wherein the first PMU is to manage transition of the apparatus from a low power state to a first active state, wherein the second PMU is to manage transition of the apparatus from the first active state to a second active state, and wherein the second PMU is to be powered down while the apparatus is to be in the low power state.

Example 2

The apparatus of example 1 or any other example, further comprising: a processor, wherein the second PMU is to manage a dynamic voltage frequency scaling for the processor.

Example 3

The apparatus of example 1 or any other example, wherein: the low power state is a first low power state; and the first PMU is to manage transition of the apparatus from the first low power state to a second low power state.

Example 4

The apparatus of example 1 or any other example, further comprising: a first die comprising the first PMU; and a second die comprising the second PMU, wherein the first die is to consume relatively low power compared to the second die, and wherein power to the second die is to be shut off while the apparatus is to be in the low power state.

Example 5

The apparatus of example 4 or any other example, further comprising: a battery; and an energy source to generate power, wherein the first die comprises circuitry to harvest power from the energy source, to recharge the battery.

Example 6

The apparatus of example 4 or any other example, wherein the second die comprises a processor to implement one or more functionalities of the apparatus.

Example 7

The apparatus of example 1 or any other example, wherein: while the apparatus is in the first active state, the first PMU is to issue a warning in response to a charge level of a battery being less than a non-critical threshold; and the second PMU is to decide to pause or abort one or more pending tasks, and to return control to the first PMU, to enable the first PMU to transition the apparatus to the low power state.

Example 8

The apparatus of example 1 or any other example, wherein: while the apparatus is in the first active state and in response to a charge level of a battery being less than a critical threshold, the first PMU is to override the second PMU and to force the apparatus to transition to the low power state.

Example 9

The apparatus of any of examples 1-8 or any other example, further comprising: a first subsystem comprising the first PMU; a second subsystem comprising the second PMU and one or more components; and a power rail supplying power to the second subsystem, wherein the first PMU is to power the power rail to a voltage specified by the second PMU.

Example 10

The apparatus of any of examples 1-8 or any other example, further comprising: a first subsystem comprising the first PMU; and a second subsystem comprising the second PMU; a power rail supplying power to the second subsystem; and a plurality of voltage domains within the second subsystem supplied by the power rail, wherein the second PMU is to control levels of voltage supplied from the power rail to the individual ones of the plurality of voltage domains.

Example 11

The apparatus of any of examples 1-8 or any other example, wherein: the apparatus has a low duty cycle of operation; and the apparatus is a Net zero energy (NZE) device.

Example 12

A system comprising: a memory to store instructions; a processor coupled to the memory; first power management circuitry to control a voltage level and/or a frequency level for the processor; second power management circuitry to control switching on and/or switching off of the first power management circuitry; and a wireless interface to allow the processor to communicate with another device.

Example 13

The system of example 12 or any other example, wherein: the first power management circuitry is to manage transition between two or more active states of the apparatus.

Example 14

The system of example 12 or any other example, wherein: the second power management circuitry comprises a Finite State Machine (FSM) to manage transition between a low power state and an active state, and between two or more low power states of the apparatus.

Example 15

The system of any of examples 12-14 or any other example, wherein the first power management circuitry is to manage dynamic voltage & frequency scaling (DVFS) for the processor.

Example 16

The system of any of examples 12-14 or any other example, wherein: the second power management circuitry is to remain switched on during one or more low power states of the apparatus; and the first power management circuitry is to remain switched off during the one or more low power states of the apparatus, and to remain switched on during one or more active states of the apparatus.

Example 17

A device comprising: hierarchical power management architecture comprising: first power management circuitry that is to remain switched on during one or more low power states and one or more active states, and second power management circuitry that is to remain switched off during the one or more low power states and remain switched on during the one or more active states, wherein the device has a low duty cycle of operation.

Example 18

The device of example 17 or any other example, wherein: the first power management circuitry consumes relatively less power to remain switched on, compared to power consumed by the second power management circuitry to remain switched on.

Example 19

The device of example 17 or any other example, further comprising: a first die comprising the first power management circuitry; and a second die comprising the second power management circuitry, wherein power supply to the second die is to be switched off during the one or more low power states.

Example 20

The device of any of examples 17-19 or any other example, wherein the device is a Net zero energy (NZE) device.

Example 21

A method comprising: managing, by a first Power Management Unit (PMU), transition of a device from a sleep state to a first active state; managing, by a second PMU, transition of the device from the first active state to a second active state; and powering down the second PMU, while the device is to be in the sleep state.

Example 22

The method of example 21 or any other example, further comprising: managing, by the second PMU, dynamic voltage frequency scaling for a processor.

Example 23

The method of any of examples 21-23 or any other example, wherein the sleep state is a first sleep state, and wherein the method further comprises: managing, by the first PMU, transition of the device from the first sleep state to a second sleep state.

Example 24

The method of any of examples 21-23 or any other example, wherein a first die comprises the first PMU, a second die comprises the second PMU, and wherein the method further comprises: consuming, by the first die, relatively low power compared to the second die; and shutting down power to the second die, including power to the second PMU, while the device is to be in the sleep state.

Example 25

The method of example 24 or any other example, further comprising: harvesting, by circuitry included in the first die, power from an energy source to recharge a battery of the device.

Example 26

One or more non-transitory computer-readable storage media to store instructions that, when executed by a processor, cause the processor to execute a method of any of the examples 21-25 or any other example.

Example 27

An apparatus comprising: means for performing the method of any of the examples 21-25 or any other example.

Example 28

An apparatus comprising: means for managing, by a first Power Management Unit (PMU), transition of a device from a sleep state to a first active state; means for managing, by a second PMU, transition of the device from the first active state to a second active state; and means for powering down the second PMU, while the device is to be in the sleep state.

Example 29

The apparatus of example 28 or any other example, further comprising: means for managing, by the second PMU, dynamic voltage frequency scaling for a processor.

Example 30

The apparatus of any of examples 28-31 or any other example, wherein the sleep state is a first sleep state, and wherein the apparatus further comprises: means for managing, by the first PMU, transition of the device from the first sleep state to a second sleep state.

Example 31

The apparatus of any of examples 28-31 or any other example, wherein a first die comprises the first PMU, a second die comprises the second PMU, and wherein the apparatus further comprises: means for consuming, by the first die, relatively low power compared to the second die; and means for shutting down power to the second die, including power to the second PMU, while the device is to be in the sleep state.

Example 32

The apparatus of any of examples 28-31 or any other example, further comprising: harvesting, by circuitry included in the first die, power from an energy source to recharge a battery of the device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first Power Management Unit (PMU); and
a second PMU,
wherein the first PMU is to manage transition of the apparatus from a low power state to a first active state,
wherein the second PMU is to manage transition of the apparatus from the first active state to a second active state,
wherein the second PMU is to be powered down while the apparatus is to be in the low power state,
wherein while the apparatus is in the first active state, the first PMU is to issue a warning in response to a charge level of a battery being less than a non-critical threshold, and
wherein the second PMU is to decide to pause or abort one or more pending tasks, and to return control to the first PMU, to enable the first PMU to transition the apparatus to the low power state.

2. The apparatus of claim 1, further comprising:
a processor,
wherein the second PMU is to manage a dynamic voltage frequency scaling for the processor.

3. The apparatus of claim 1, wherein:
the low power state is a first low power state; and
the first PMU is to manage transition of the apparatus from the first low power state to a second low power state.

4. The apparatus of claim 1, further comprising:
a first die comprising the first PMU; and
a second die comprising the second PMU,
wherein the first die is to consume relatively low power compared to the second die, and
wherein power to the second die is to be shut off while the apparatus is to be in the low power state.

5. The apparatus of claim 4, further comprising:
the battery; and
an energy source to generate power,
wherein the first die comprises circuitry to harvest power from the energy source, to recharge the battery.

6. The apparatus of claim 4, wherein the second die comprises a processor to implement one or more functionalities of the apparatus.

7. The apparatus of claim 1, wherein:
while the apparatus is in the first active state and in response to a charge level of the battery being less than a critical threshold, the first PMU is to override the second PMU and to force the apparatus to transition to the low power state.

8. The apparatus of claim 1, further comprising:
a first subsystem comprising the first PMU;
a second subsystem comprising the second PMU and one or more components; and
a power rail to supply power to the second subsystem,
wherein the first PMU is to power the power rail to a voltage specified by the second PMU.

9. The apparatus of claim 1, further comprising:
a first subsystem comprising the first PMU;
a second subsystem comprising the second PMU;
a power rail to supply power to the second subsystem; and
a plurality of voltage domains within the second subsystem supplied by the power rail,
wherein the second PMU is to control levels of voltage supplied from the power rail to the individual ones of the plurality of voltage domains.

10. The apparatus of claim 1, wherein:
the apparatus has a low duty cycle of operation; and
the apparatus is a Net zero energy (NZE) device.

11. A system comprising:
a battery;
a memory to store instructions;
a processor coupled to the memory;
first power management circuitry to control a voltage level and/or a frequency level for the processor;
second power management circuitry to control switching on and/or switching off of the first power management circuitry, wherein while the processor is in an active state, the second power management circuitry is to issue a warning in response to a charge level of the battery being less than a non-critical threshold; and
wherein the first management circuitry is to decide to pause or abort one or more unresolved tasks, and to return control to the second management circuitry, to enable the second power management circuit to transition the processor to the low power state; and
a wireless interface to allow the processor to communicate with another device.

12. The system of claim 11, wherein:
the first power management circuitry is to manage transition between two or more active states of the system.

13. The system of claim 11, wherein:
the second power management circuitry comprises a Finite State Machine (FSM) to manage transition between a low power state and an active state, and between two or more low power states of the system.

14. The system of claim 11, wherein the first power management circuitry is to manage dynamic voltage and frequency scaling (DVFS) for the processor.

15. The system of claim 11, wherein:
the second power management circuitry is to remain switched on during one or more low power states of the processor; and
the first power management circuitry is to remain switched off during the one or more low power states of the processor, and to remain switched on during one or more active states of the system.

16. A device comprising:
hierarchical power management architecture comprising:
first power management circuitry that is to remain switched on during one or more low power states and one or more active states; and second power management circuitry that is to remain switched off during the one or more low power states and remain switched on during the one or more active states, wherein the device has a low duty cycle of operation, wherein while the device is in an active state, the first power management circuitry is to issue a warning in response to a charge level of a battery being less than a non-critical threshold, and wherein the second power management circuitry is to decide to pause or abort one or more unresolved tasks, and to return control to the first power management circuitry, to enable the first power management circuitry to transition the device to the low power state.

17. The device of claim 16, wherein:
the first power management circuitry consumes relatively less power to remain switched on, compared to power consumed by the second power management circuitry to remain switched on.

18. The device of claim 16, further comprising:
a first die comprising the first power management circuitry; and
a second die comprising the second power management circuitry,
wherein power supply to the second die is to be switched off during the one or more low power states.

19. The device of claim 16, wherein the device is a Net zero energy (NZE) device.

* * * * *